Patented July 16, 1940

2,207,791

UNITED STATES PATENT OFFICE 2,207,791

MANUFACTURE OF SULPHUR NITRIDE

Willis Conard Fernelius, Columbus, Ohio

No Drawing. Application March 18, 1938,
Serial No. 196,627

11 Claims. (Cl. 23—191)

The invention relates to production of sulphur nitride ($S_4N_4$) and has for its principal object to provide a simple, cheap and effective method of producing this compound. More specifically stated, the object is to provide a method of producing $S_4N_4$ directly from sulphur monochloride or equivalent and ammonia and without the formation of any great quantities of by-products, a difficulty which has been experienced in the past.

In accordance with the invention, I bring together sulphur monochloride or a more highly chlorinated sulphur compound and an excess of ammonia, both reactants being substantially anhydrous, which react, in the case of $S_2Cl_2$, according to the following ideal equation:

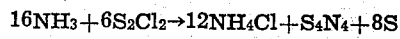

$$16NH_3 + 6S_2Cl_2 \rightarrow 12NH_4Cl + S_4N_4 + 8S$$

In practice, this equation merely represents the end result, which is approached but never completely attained. Apparently the reaction proceeds through intermediate stages to a large extent, but may possibly go directly to the end products to some extent. It is relatively unimportant, practically, what intermediate compounds are formed so long as the end result approaches that indicated in the equation. In the past it has been difficult to complete the conversion of the intermediate compounds to the final products. If conditions are unfavorable, some of the intermediate products may undergo secondary reactions, giving rise to such compounds as $N_2S_5$, $S_6NH_2$, etc. The conditions which I believe to be essential to the most nearly complete avoidance of these undesirable by-products are excess of $NH_3$, and low temperature. It is highly desirable to operate in non-aqueous medium, although a small proportion of moisture, such as may be in ordinary technical materials, can be tolerated. No extraordinary degree of dryness is necessary. The temperature requirement is satisfied by the preferred mode of operation to be described, but not, for example, by bubbling $NH_3$ through equal parts $S_2Cl_2$ and toluene, starting at room temperature. I prefer to have the ammonia present in great excess as by the employment of a liquid phase reaction wherein the $S_2Cl_2$ or equivalent is in solution in an organic solvent, such as toluene, and such solution is added to liquid ammonia or a non-aqueous liquid, such as toluene, at any convenient temperature such as room temperature, having dissolved therein enough $NH_3$ to render the same in excess with respect to the $S_2Cl_2$ which is added. On account of the dilution of the $S_2Cl_2$ by the toluene, as long as a drop or portion of solution may be considered as retaining its integrity in the liquid ammonia or ammonia solution, the ammonia will be in excess at the interface. As soon as the drop has lost its integrity, the excess of ammonia will be even greater, but if the $NH_3$ were added dropwise to the solution of $S_2Cl_2$, there would be an excess of $NH_3$ at the interface so long as the drop retained its integrity, after which the $S_2Cl_2$ would come to be present in great excess at the points of reaction. If ammonia were added to the $S_2Cl_2$ solution in the form of gas bubbles, $S_2Cl_2$ would always be in excess. While the addition of a solution of $S_2Cl_2$ in toluene dropwise to liquid ammonia or a solution of $NH_3$ in an organic solvent is the present preferred manner of realizing my invention, I consider that any mode of bringing $S_2Cl_2$ or equivalent compound into contact with an excess of $NH_3$, at a proper reaction temperature, is within the broad scope thereof.

As the reaction products accumulate in the liquid ammonia, the contact between the intermediate products and the $NH_3$ becomes poorer. Hence the need to bring the reaction to substantial completion almost immediately by maintaining a large excess of $NH_3$ at the points of reaction.

$SCl_4$ may be used in place of $S_2Cl_2$ as may also the so-called $SCl_2$ which has been shown to be a solution of $SCl_4$ and $Cl_2$ in $S_2Cl_2$. Accordingly, while $S_2Cl_2$ is specified in the following description, it is to be understood that equivalent compounds may be used.

In the preferred mode of practicing my invention, I dissolve $S_2Cl_2$ in sufficient quantity of toluene to hold the same in solution and to reduce the intensity of the reaction to the desired degree. If the solution is pre-cooled, it may be more concentrated. (Other organic solvents inert to and at least partially miscible with $NH_3$, such as $CCl_4$, $CHCl_3$, $C_6H_6$, $(C_2H_5)_2O$, may be used instead of toluene.) This solution is cooled to a temperature below $-33°$ C. and added dropwise with stirring or other form of agitation to a vessel containing an excess of liquid ammonia. The products of the reaction are all fairly soluble in liquid ammonia so that no precipitate is formed at the beginning of the reaction. Before precipitation has occurred to such an extent that the reaction becomes incomplete, addition of $S_2Cl_2$ is discontinued, the ammonia is removed by evaporation (preferably being recovered for reuse), toluene is removed from the residue as by filtration and evaporation, and the resulting material is leached with water to remove the $NH_4Cl$. The result is a free-flowing yellow-orange powder consisting substantially entirely of sulphur and $S_4N_4$. While the $S_4N_4$ and sulphur may be separated as by extraction with $CS_2$ and crystallization from benzene, the product is useful without such separation, e. g., as an insecticide. Indeed, it is superior to the pure $S_4N_4$ since the latter is explosive, while the mixture is not. The sulphur, $S_4N_4$ mixture may be admixed with bentonite, talc, or the like for production of a powdered insecticide, it may be used alone, or it may be dissolved in a solvent such as benzene, kerosene, carbon tetrachloride, carbon disulphide, alcohol, turpentine, mineral spirits, ether, chloroform or the like for production of a liquid insecticide.

It is within the contemplation of the invention to use a solid diluent instead of toluene or the like; for example, I may use silica sand as a carrier for $S_2Cl_2$ and introduce the same into liquid ammonia. At the end of the reaction, the sand may be separated by decantation or filtration. I may also add $S_2Cl_2$ and $NH_3$ simultaneously, with stirring, to an organic solvent, $NH_3$ being added in excess.

*Example*

125 cc. of $S_2Cl_2$ were dissolved in 500 cc. of toluene. This solution was added in discrete drops to an open vessel containing 1500 cc. of liquid ammonia, with stirring. Substantially, no fumes other than $NH_2$ were evolved. (If at any time the excess of ammonia had been destroyed, as evidenced by the appearance of an orange or brown color instead of the customary dark purple, liquid ammonia was added.) Upon the completion of the reaction, the excess of ammonia was evaporated. The toluene was then filtered from the solids under suction. The solid was next placed under diminished pressure until the greater part of the ammonia of crystallization of the $S_4N_4$ was removed. A gradual color change from a fairly bright orange to a light greenish yellow indicated the complete removal of ammonia. (During this operation, the mixture may be heated to 100° C. with safety.) Following the removal of the $NH_3$, the mixture was leached with water to remove $NH_4Cl$. When the product containing $S_4N_4$ and sulphur was completely air dried, it weighed 72.3 g.

To produce an insecticide suitable for use as a spray, the sulphur and sulphur nitride mixture is dissolved in a suitable quantity of a suitable solvent as above indicated. To produce an insecticide suitable for use as a dust, the sulphur nitride mixture is thoroughly ground with several times its weight (up to 10,000) of bentonite, talc or the like.

Having thus described my invention, what I claim is:

1. Process of making sulphur nitride comprising contacting a mixture of a sulphur-chlorine compound and a non-aqueous diluent, such sulphur-chlorine compound containing at least as many chlorine atoms as sulphur atoms, with an excess of a liquid material of the class consisting of liquid $NH_3$, and solutions of $NH_3$ in organic solvents both reactants being substantially dry, $NH_3$ being maintained in excess in the reaction mixture at all times.

2. Process of making sulphur nitride comprising contacting a mixture of a sulphur-chlorine compound with a non-aqueous diluent, such sulphur-chlorine compound containing at least as many chlorine atoms as sulphur atoms, with an excess of a liquid material of the class consisting of liquid $NH_3$ and solutions of $NH_3$ in organic solvents in a liquid phase reaction, both reactants being substantially dry, $NH_3$ being maintained in excess in the reaction mixture at all times.

3. Process of making sulphur nitride comprising adding a solution of a sulphur-chlorine compound containing at least as many chlorine atoms as sulphur atoms in an organic diluent inert to liquid ammonia, in small portions, with agitation, to a body of liquid ammonia and separating the reaction product from the excess ammonia and the organic diluent.

4. Process of making sulphur nitride comprising adding a solution of a sulphur-chlorine compound containing at least as many chlorine atoms as sulphur atoms in an organic diluent inert to liquid ammonia, in small portions, with agitation, to a body of liquid ammonia, separating the reaction product from the excess ammonia and the organic diluent and removing therefrom the $NH_4Cl$ content.

5. Process of making sulphur nitride comprising adding a solution of a sulphur-chlorine compound containing at least as many chlorine atoms as sulphur atoms in an organic solvent in small portions with agitation to a body of an organic solvent containing ammonia, separating the reaction product from the excess ammonia and the organic solvent and removing therefrom the $NH_4Cl$ content, the concentration of ammonia in the solvent bodies being such that ammonia is always in excess with respect to the sulphur-chlorine compound.

6. Process of making sulphur nitride comprising adding a solution of $S_2Cl_2$ in an organic solvent inert to liquid ammonia, in small portions, with agitation, to a body of liquid ammonia, separating the reaction product from the excess ammonia and the organic solvent, and removing therefrom the $NH_4Cl$ content.

7. Process of making sulphur nitride comprising adding a solution of $S_2Cl_2$ in an organic solvent in small portions with agitation to a body of an organic solvent containing ammonia, separating the reaction product from the excess ammonia and the organic solvent and removing therefrom the $NH_4Cl$ content, the concentration of ammonia in the solvent bodies being such that ammonia is always in excess with respect to the sulphur-chlorine compound.

8. Process of making sulphur nitride comprising bringing together $S_2Cl_2$, an excess of liquid $NH_3$ and an organic diluent inert to the reactants, said diluent being present in greater quantity than $S_2Cl_2$, $NH_3$ being maintained in excess in the reaction mixture at all times.

9. Process of making sulphur nitride comprising mixing $S_2Cl_2$ with a solid diluent and contacting the resulting mixture with liquid $NH_3$, said diluent being present in greater quantity than $S_2Cl_2$ and said $NH_3$ being in excess with respect to $S_2Cl_2$.

10. Process of making sulphur nitride comprising mixing $S_2Cl_2$ with a diluent and contacting the resulting mixture with liquid $NH_3$, said diluent being present in greater quantity than $S_2Cl_2$ and said $NH_3$ being in excess with respect to $S_2Cl_2$.

11. Process of making sulphur nitride comprising forming a mixture of a non-aqueous, inert, diluent with a sulphur-chlorine compound containing at least as many chlorine atoms as sulphur atoms and introducing said mixture, in small portions, into a substance of the class consisting of liquid ammonia and inert fluids containing ammonia, ammonia being maintained in excess in the reaction mixture.

WILLIS CONARD FERNELIUS.